(12) United States Patent
Hong et al.

(10) Patent No.: US 7,919,703 B2
(45) Date of Patent: Apr. 5, 2011

(54) METHOD FOR REMOVING THE STAFF LINES FROM A MUSIC SCORE IMAGE

(75) Inventors: Tae-Hwa Hong, Seoul (KR); Yun-Je Oh, Yongin-si (KR); Sung-Dae Cho, Yongin-si (KR); Guee-Sang Lee, Gwangju (KR); Hwa-Jeong Son, Jeollanam-do (KR)

(73) Assignees: Samsung Electronics Co., Ltd., Maetan-Dong, Yeong Tong-Gu, Suwon-Si, Gyeonggi-Do (KR); Industry Foundation of Chonnam National University, Yong Bong-Dong, Buk-Gu, Gwangju (KR)

( * ) Notice: Subject to any disclaimer, the term of this patent is extended or adjusted under 35 U.S.C. 154(b) by 219 days.

(21) Appl. No.: 12/202,488

(22) Filed: Sep. 2, 2008

(65) Prior Publication Data

US 2009/0056524 A1 Mar. 5, 2009

(30) Foreign Application Priority Data

Aug. 31, 2007 (KR) .......................... 10-2007-0088319

(51) Int. Cl.
*G09B 15/00* (2006.01)

(52) U.S. Cl. .................. 84/483.1; 84/470 R; 84/477 R; 84/483.2; 84/485 R

(58) Field of Classification Search .................. None
See application file for complete search history.

(56) References Cited

U.S. PATENT DOCUMENTS

| 5,549,029 | A  * | 8/1996  | Lepinski ..................... 84/483.2 |
| 5,706,363 | A  * | 1/1998  | Kikuchi ...................... 382/113 |
| 7,074,999 | B2 * | 7/2006  | Sitrick et al. ................ 84/477 R |
| 7,612,278 | B2 * | 11/2009 | Sitrick et al. ................ 84/609 |
| 2003/0100965 | A1 * | 5/2003 | Sitrick et al. ................ 700/83 |
| 2003/0110925 | A1 * | 6/2003 | Sitrick et al. ................ 84/477 R |
| 2003/0110926 | A1 * | 6/2003 | Sitrick et al. ................ 84/477 R |
| 2004/0139843 | A1 * | 7/2004 | Forster ........................ 84/483.2 |
| 2006/0288842 | A1 * | 12/2006 | Sitrick et al. ............... 84/477 R |

* cited by examiner

*Primary Examiner* — Marlon T Fletcher
(74) *Attorney, Agent, or Firm* — Cha & Reiter, LLC

(57) ABSTRACT

Disclosed is a method of removing staff lines from a music score an image. The method includes detecting a region with staff lines in an image including a music score; checking a gradient of the staff lines, and dividing the staff lines extending continuously in a longitudinal direction into a plurality of regions in consideration of the gradient, estimating each of the staff lines included in the divided regions by analyzing a histogram of the image, extracting each of the staff lines from the music score on the basis of the estimated staff lines and removing each of the extracted lines of the staff lines from the music score.

22 Claims, 14 Drawing Sheets

FIG.4A

METHOD FOR REMOVING THE STAFF LINES FROM A MUSIC SCORE IMAGE

CLAIM OF PRIORITY

This application claims the benefit of the earlier filing date, under 35 U.S.C. §119, (e), to that patent application entitled "Method for Removing the Staff Lines from a Music Score Image" filed in the Korean Intellectual Property Office on Aug. 31, 2007 and assigned Serial No. 2007-0088319, the contents of which are hereby incorporated by reference.

BACKGROUND OF THE INVENTION

1. Field of the Invention

The present invention relates to the field of music recognition, and more particularly to a method of recognizing a music score included in an image and extracting and removing the staff lines from a music score in the image.

2. Description of the Related Art

Mobile terminals have become common practice, and many people use a personal mobile terminal for voice or data communication. As mobile terminals become recognized as a personal apparatus for many people, rather than just for simple voice or data communication, their use has been extended to represent a multimedia apparatus including many additional functions, such as an MP3 player, a camera, a video player, an electronic dictionary, a game player, etc.

Moreover, users desire a mobile terminal with additional functions for other purposes. Mobile terminal manufacturers try to manufacture mobile terminals having various functions to distinguish their product from that of other companies in order to meet the user's desire.

Meanwhile, as technologies for image recognition are developed, a technology for extracting a music score from image data which is generated by scanning a music score printed on a sheet using an image recognition apparatus, such as a scanner, has developed in various ways.

The staff lines act as a cause for noise in detecting symbols of the music score, but at the same time they provide important information for analyzing and recognizing the symbols. Therefore, in a method of recognizing a music score included in an image, it is very important to detect and remove the staff lines from a music score.

Most images of music scores are generated by recognizing an image on an original copy printed on paper through an image recognition apparatus, e.g., a scanner. This may may cause the music score included in the image to be inclined or bent. Conventionally, the vertical run-length coding, the Hough conversion, the line adjacency graph (LAG), and the DP matching are applied in order to solve these problems. However, in these methods, is a limitation in achieving a good image quality of a music score image scanned at 300 DPI, using an image recognition apparatus such as a scanner. When a music score image is obtained through a camera provided in a mobile terminal, the image quality is even further limited. Further, it is likely that distortion occurs in accordance with a location or an angle of an image, which causes the music score to be inclined or bent. As a result, a music score included in an image obtained by using the above-mentioned methods is difficult to be recognized.

Accordingly, there is a need for a method of directly recognizing a music score included in a low-quality music score image that may be obtained through a camera provided in a mobile terminal, without any editing program.

SUMMARY OF THE INVENTION

Accordingly, the present invention provides a method of accurately and rapidly removing the staff lines from a music score in an image without a separate gradient compensation or a conversion procedure.

In accordance with an aspect of the present invention, there is provided a method for removing the staff lines from a music score provided with at least one line in the music score included in an image, the method including the steps of detecting a region with the staff lines in the image including the music score, checking a gradient of the staff lines, and dividing the staff lines extending continuously in a longitudinal direction into a plurality of regions in consideration of the gradient, estimating each of the staff lines included in the divided regions of the music score by analyzing a histogram of the image, extracting each of the staff lines from the music score on the basis of the estimated staff lines and removing each of the extracted lines of the staff lines from the music score.

In addition, in the step of detecting a region with the staff lines, it is preferable that the histogram of the image is calculated and the region be detected by checking a distribution of the histogram.

In addition, the gradient of the staff lines may be measured on the basis of coordinates of the image.

In addition, in a preferable aspect of the invention the method include a step of binary-coding the received image.

In addition, the method may further include a step of removing noise in consideration of a dimension of an object by analyzing the object included in the image.

In addition, in a preferable aspect of the invention consecutively arranged elements having the same pixel value are considered as one object, and the object be processed as noise when the size of the object is smaller than a predetermined value.

In addition, the step of estimating each of the staff lines may include the steps of calculating the histogram of the divided regions in the image and comparing the calculated value and a predetermined threshold value, wherein, when the calculated value is relatively larger than the predetermined threshold value, the regions may be estimated to correspond to each of the staff lines.

In addition, the threshold value may be set in consideration of a maximum value and an average value of the histogram in a longitudinal direction.

In addition, the step of estimating each of the staff line may include the steps of estimating the top and/or the bottom line of the staff lines by using the histogram in a longitudinal direction and estimating each of the staff lines on the basis of a value of the histogram of the top and/or the bottom line.

In addition, in a preferable aspect of the invention each of the staff lines is estimated in consideration of a width between each of the staff lines.

In addition, in the estimated lines included in the staff lines, when differences in a distance between adjacent lines are larger than the predetermined threshold value, it is preferable that the estimated lines are not included in the staff lines.

In addition, the step of dividing the staff lines region may include the steps of setting a number of boundary lines for dividing the staff lines, equally dividing the staff lines in a longitudinal direction in accordance with the number of the boundary lines, checking gradients of the staff lines on the basis of coordinates corresponding to intersections of the staff lines and the boundary line dividing the staff lines in the image and confirming the number of divisions of the staff lines in consideration of the gradients.

In addition, the step of dividing the staff lines region may include the steps of: setting an initial value of the number of points for dividing the staff lines, equally dividing the staff lines in a longitudinal direction in accordance with the number of the points, calculating differences in distance between the points on the basis of coordinates corresponding to intersections of the staff lines and the boundary line dividing the staff lines in accordance with the initial value, calculating an average value of calculated differences in distance, comparing the average value with a predetermined threshold value, checking the number of the used points against a predetermined threshold value, wherein, when the average value is larger than the predetermined threshold value or when the number of the used points is smaller than the predetermined threshold value, the number of the points for dividing the staff lines is reset, and the steps of equally dividing the staff lines, calculating differences in distance between the intersections, and calculating an average value are repeatedly carried out, and when the average value is equal to or smaller than the predetermined threshold value or when the number of the used points is equal to or larger than the predetermined threshold value, the staff lines are equally divided in a longitudinal direction in accordance with the used points.

BRIEF DESCRIPTION OF THE DRAWINGS

The above and other aspects, features and advantages of the present invention will be more apparent from the following detailed description taken in conjunction with the accompanying drawings, in which:

FIG. 4A is an exemplary diagram illustrating an image including a music score and a an exemplary histogram in a horizontal direction according to an embodiment of the present invention;

DETAILED DESCRIPTION THE INVENTION

Exemplary embodiments of the present invention are described with reference to the accompanying drawings. In the following description, specific definitions are provided only to help general understanding of the present invention, and it would apparent to those skilled in the art that the present invention can be implemented without such definitions.

Figure 1:
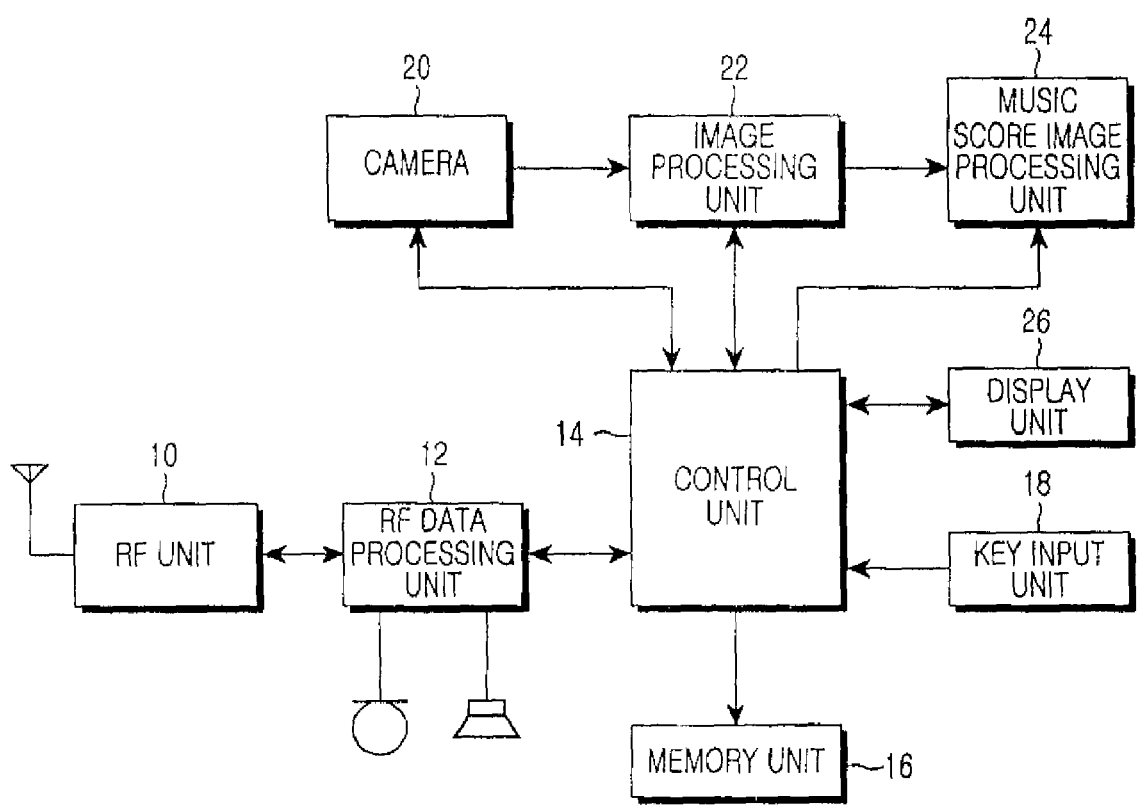
FIG. 1 is a diagram illustrating a structure of a mobile terminal according to the present invention.

FIG. 1 illustrates an exemplary structure of a mobile terminal according to the present invention. In the present invention, among various devices capable of recognizing a digital image of a music score, a hardware-based device, for example, a mobile terminal as shown in FIG. 1, which can be applied to the present invention, will now be described first. Although the present invention is described with regard to a mobile terminal, it would be recognized by those skilled in the art that the principles of the invention are not limited to mobile terminals and that other types of devices may incorporate the invention described, herein, without altering the principles of the invention.

Referring to FIG. 1, a mobile terminal capable of recognizing a digital image of a music score and removing the staff lines of the music score image includes a camera 20, an image processing unit 22, a music score image processing unit 24, a display unit 26, a control unit 14, a memory unit 16, a key input unit 18, an RF unit 10, and an RF data processing unit 12.

The RF unit 10 modulates voices, data, and control data input by a user into radio frequency signals, transmitting the radio frequency signals to a base station (not shown) over a mobile radio communication network, and also receives radio frequency signals from a base station, and then demodulates voices, data, and control data to be output. The RF data processing unit 12, under the control of the control unit 14, decodes voice information received from the RF unit 10, outputs audible sounds corresponding to the decoded voice information through a speaker, outputs signals corresponding to user's voice signals received from a microphone to the RF unit 10, and then provides data and control data received from the RF unit 10 to the control unit 14.

The camera 20 performs general digital camera functions under the control of the control unit 14, so that it takes visible light received from an external object. The image processing unit 22 converts image data output from the camera 20 into digital image data with a proper format.

The key input unit 18 serves as a device to receive information such as a telephone number or characters from a user, which includes keys for receiving numerals and character information and function keys for setting various functions, and outputting the input signals to the control unit 14. The display unit 26 includes a display device, such as a liquid crystal display (LCD), which displays the digital image data and messages on various operating status of a corresponding terminal under the control of the control unit 14.

The control unit 14 controls general operation of the mobile communication terminal by generally controlling the above function units. That is, the control unit 14 performs processes according to numerals and menu selection signals received through the key input unit 18, performs processes according to external signals taken through the camera 20, and outputs images taken through the camera and image output signals needed for various operations to the display unit 26. Further, the control unit 14 receives a request from the outside for removing the staff lines of a music score image so as to perform functions for controlling a music score image processing unit 24. Further, when necessary, the control unit 14 accesses content stored in the memory unit 16, or stores content in the memory unit 16. A plurality of programs and data related to the operation of the control unit 14 are stored in the memory unit 161.

The above-structured mobile terminal performs operations related to general mobile communication services including a function of removing the staff lines of a music score image. Here, the control unit 14 also performs an operation of removing the staff lines of a music score image according to the present invention as well as the above functions. In addition, within the memory unit 16 is stored an operating program for the control unit 14 according to the present invention, to remove the staff lines of a music score image.

In particular, when the mobile terminal performs an operation of removing the staff lines of a music score image according to the present invention, the mobile terminal makes an image taken through the camera or an image including a music score received from an external electronic device to be binary-coded, calculates a histogram of the image, estimates regions where the staff lines are located based on the histogram, and removes the staff lines and unnecessary objects in the image.

An operation of removing the staff lines of a music score image according to the present invention is now described in detail with reference to accompanying drawings.

Figure 2:
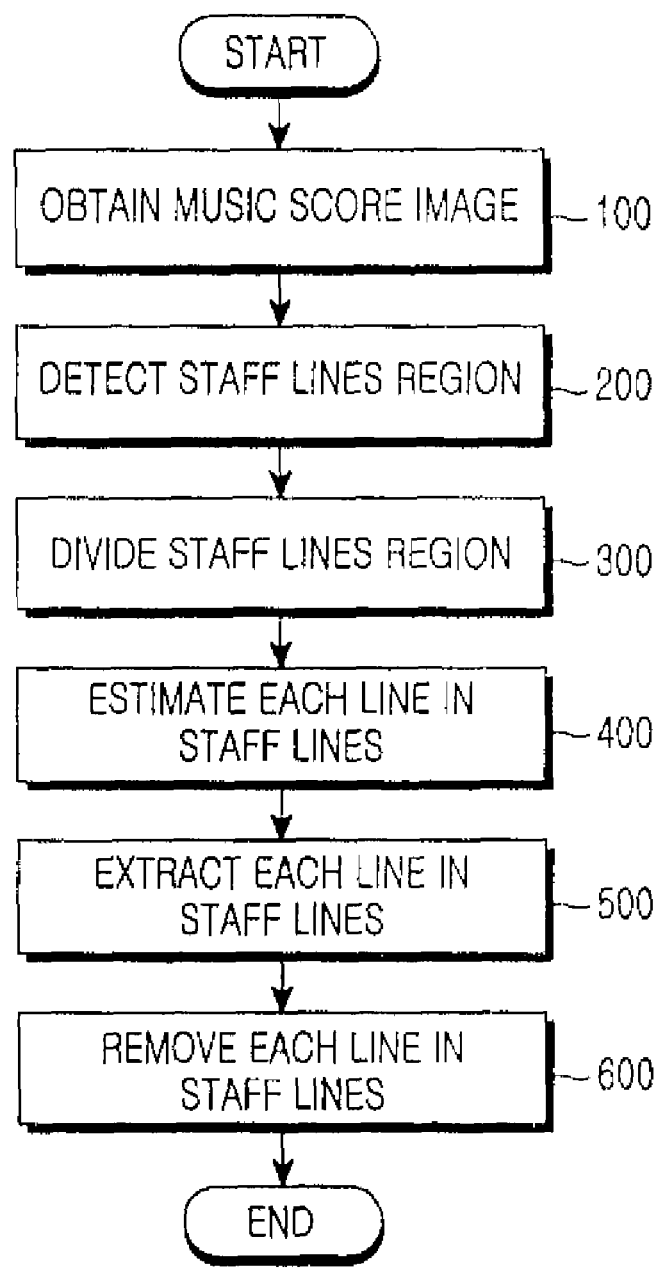
FIG. 2 is a flowchart illustrating a procedure for removing the staff lines in a music score image according to an embodiment of the present invention.

FIG. 2 shows a flowchart illustrating a procedure of removing the staff lines in a music score image according to an embodiment of the present invention. Referring to FIG. 2, at step 100, an image of an object including a music score is obtained by operating a camera provided within the mobile terminal, or an image (including a music score) is received from an external electronic device (for example, a camera, a scanner, a personal computer, a server for storing and managing a music score image) through an interface capable of wire/wireless communication.

In step 200, regions where the staff lines are located are determined by using a histogram representing distribution of pixels included in the image. Here, since it suffices that the staff lines and musical notes are identified from the music score included in the image, the image may not be expressed in various colors. Therefore, in step 200, it is preferred that the image including the music score be binary-coded with precedence (refer to step 210 in FIG. 3). For example, the step of binary-coding may express the image including the music score as two colors in consideration of a background color (for example, white) and an object color included in the music score (for example, black) of the image. Further, in step 200, after the image included in the music score is binary-coded, a histogram of the image is calculated (step 220, FIG. 3). Here, since music score information, such as the staff lines, the music score, or lyrics, may be distributed in the image including the music score, it is not easy which regions including the music score are detected by using a histogram of a width direction (for example, vertical direction) of the music score. Therefore, it is preferable to calculate a histogram in a longitudinal direction (for example, horizontal direction) of the music score included in the image in order to detect regions including the staff lines without unnecessary calculation of the histogram. Further, in step 200, regions where distributed histogram values are significantly large as compared with other regions in consideration of the calculated histogram are considered as regions with the staff lines (hereinafter, referred to as the staff lines region), so that the regions are extracted from the staff lines region (step 230, FIG. 3).

Figure 4A:
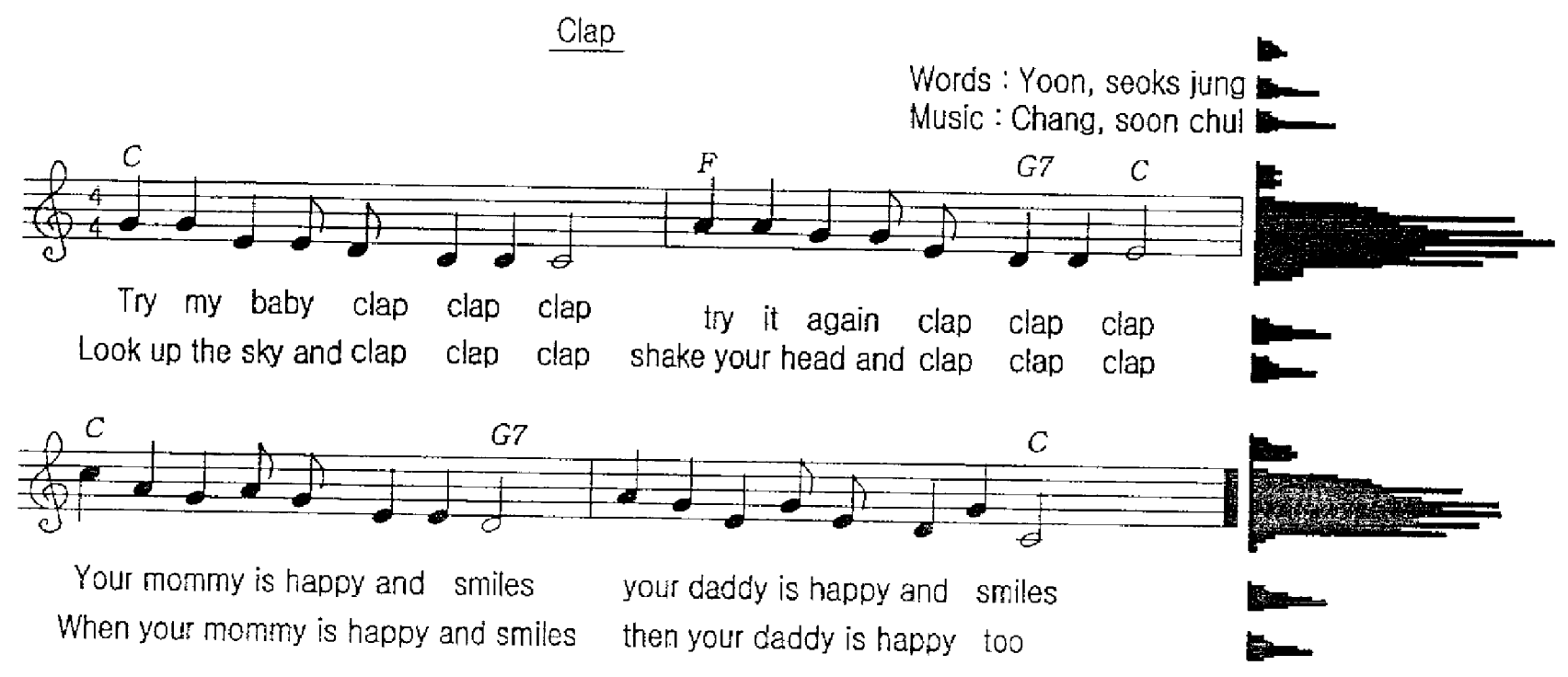
Figure 4B:
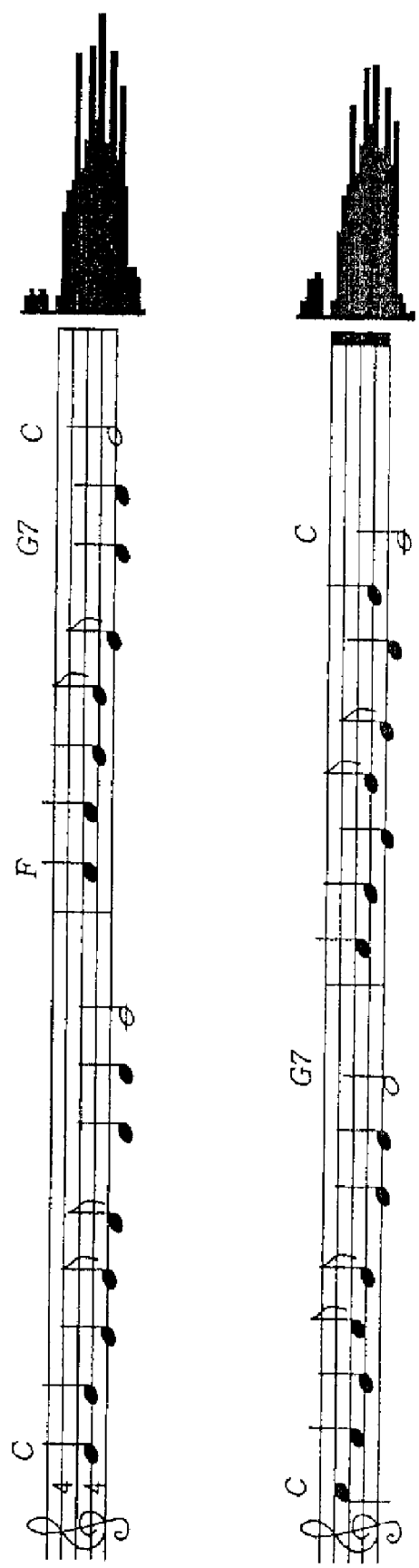
FIG. 4B is an exemplary diagram illustrating an image in which the staff lines region is extracted from an image including a music score and an exemplary histogram of the image in a horizontal direction according to an embodiment of the present invention.

More particularly, FIG. 4A shows a diagram illustrating an image including a music score and a an exemplary histogram in a horizontal direction according to the embodiment of the present invention, and FIG. 4B shows a diagram illustrating an image in which the staff lines region is extracted from an image including a music score and an exemplary histogram of the image in a horizontal direction according to the embodiment of the present invention.

Figure 3:
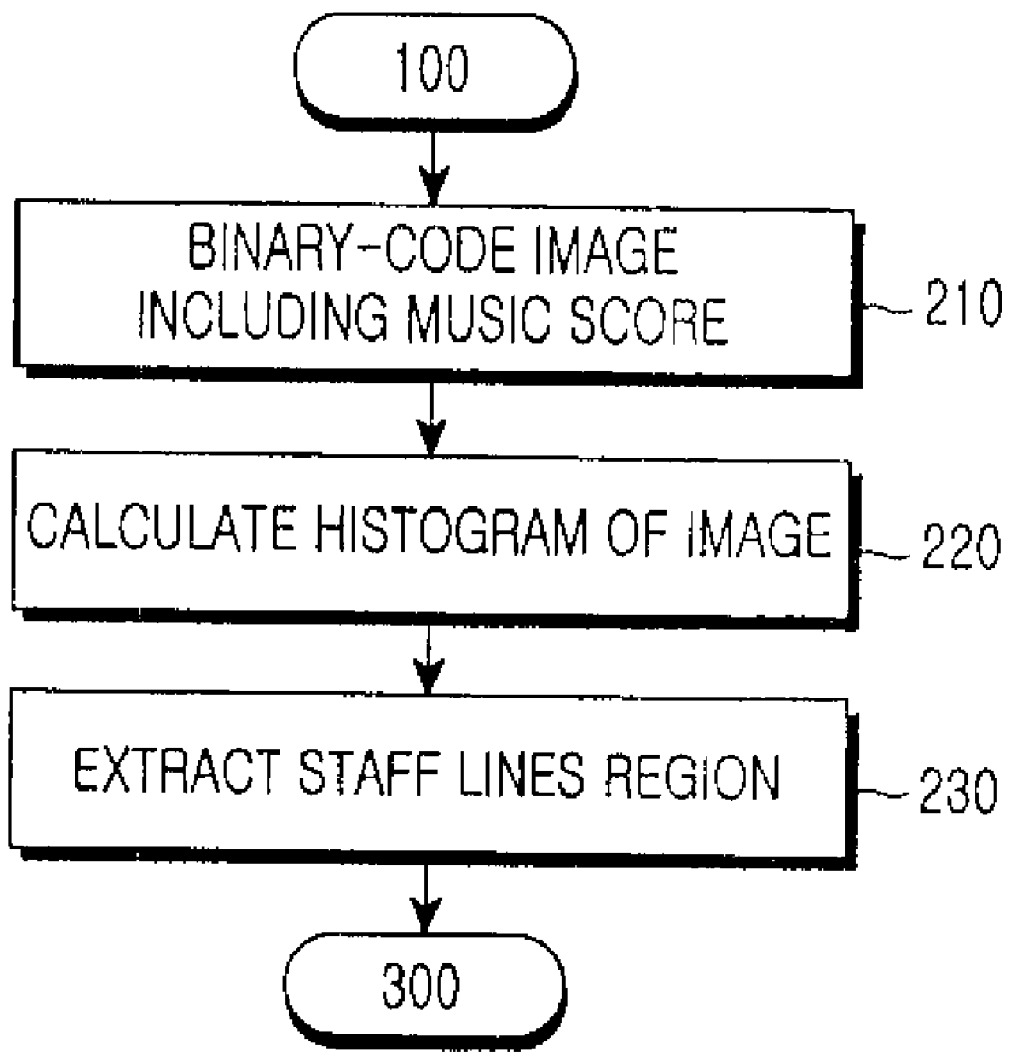
FIG. 3 is a detailed flowchart illustrating a procedure of detecting a region of the staff lines in the in accordance with the method shown in FIG. 2.

With reference to FIG. 4A, a histogram of the image including the music score can be calculated in step 220 (FIG. 3), and with reference to in FIG. 4B, the staff lines region can be extracted in step 230 (FIG. 3). More particularly, in step 230, connected component analysis is performed in a vertical direction for a horizontal histogram image, and data runs of connected components are accumulated. The connected regions where the accumulated value is higher than 75% of the maximum value of the accumulated values are estimated as regions of the staff lines. Further, regions other than the estimated staff lines regions (that is, title, lyrics, composer, songwriter, etc.) are removed.

When the image including the music score has been binary-coded and the staff lines region has been detected, exact information (location information of each line, thickness, and distances between the staff lines) of the staff lines is determined as a next step 500 and objects other than objects related to the music score are removed.

However, when inclination or bending of the staff lines occurs on obtaining the image containing the music score, it is difficult to accurately extract the staff lines region. According to an embodiment of the present invention, the staff lines region included in the image is divided in a longitudinal direction (step 300, FIG. 2) without separate compensation, and finally the staff lines are extracted (steps 400, 500, FIG. 2), so that the staff lines are removed from the image (step 600, FIG. 2).

Figure 5:
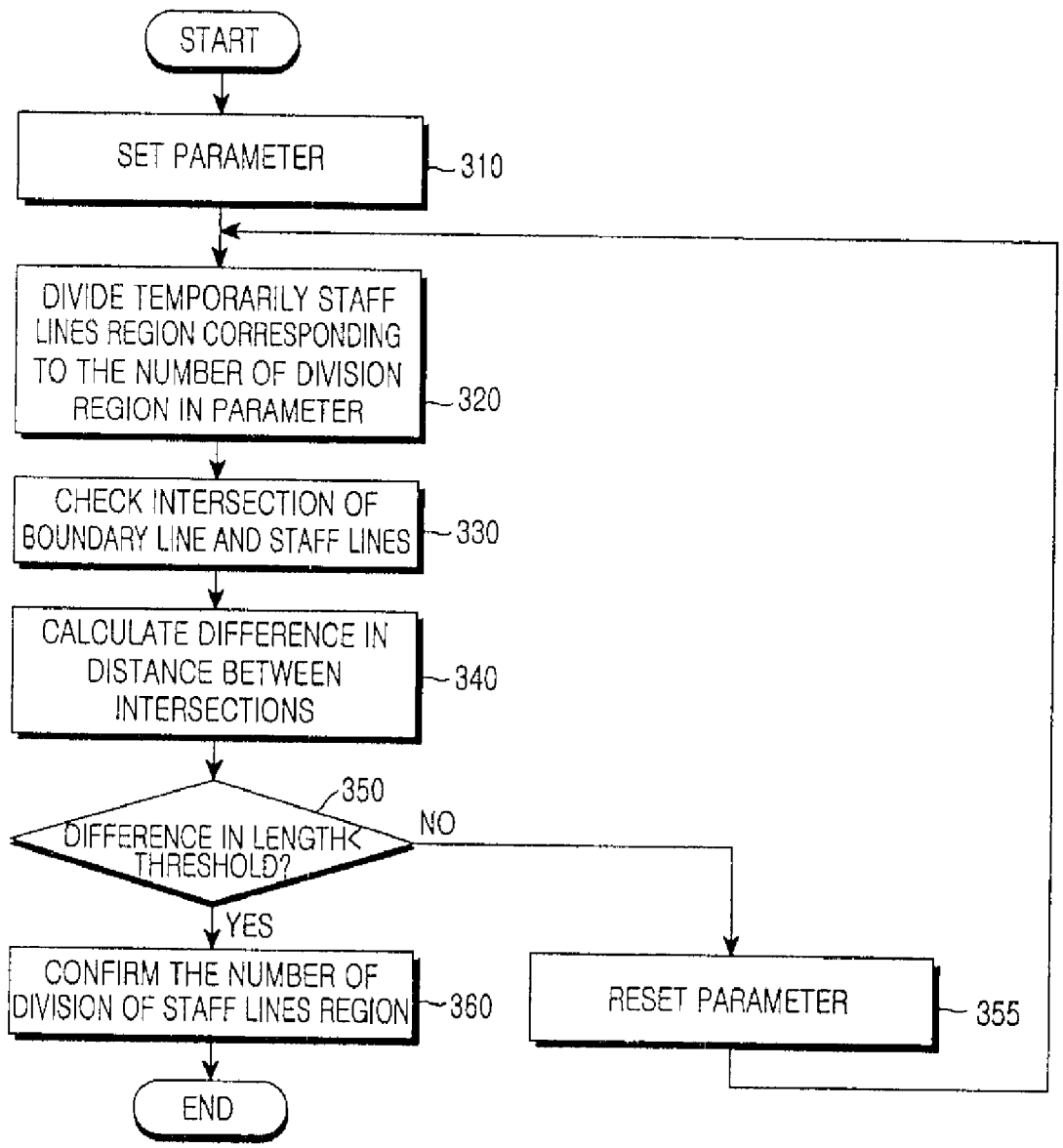
FIG. 5 is a detailed flowchart illustrating a step of dividing the staff lines region in in accordance with the method shown in FIG. 2.

FIG. 5 shows a detailed flowchart illustrating a step of dividing the staff lines region (step 300, FIG. 2) according to an embodiment of the present invention. Referring to FIG. 5, in the step of dividing the staff lines region in a longitudinal direction, a parameter value necessary for dividing the staff lines region is set (step 310). Here, the parameter value may represent a number of division regions to divide the staff lines region, the number of boundary lines used in dividing or the like. For example, the number of division regions and the number of boundary lines can be calculated by equations (1) and (2) below, respectively:

$$\text{The number of division regions}(N)=4*t \quad (1)$$

where t is a natural number sequentially increasing, with an initial value is 1, $$\text{The number of boundary lines}(K)=N-1 \quad (2)$$

While the parameter value is shown by way of example in equations (1) and (2) in the embodiment of the present invention, it is not intended to limit the present invention to this single representation. It suffices that the number of division regions and the number of boundary lines used in dividing can be set using other known methods of division or may be set manually.

Figure 6:
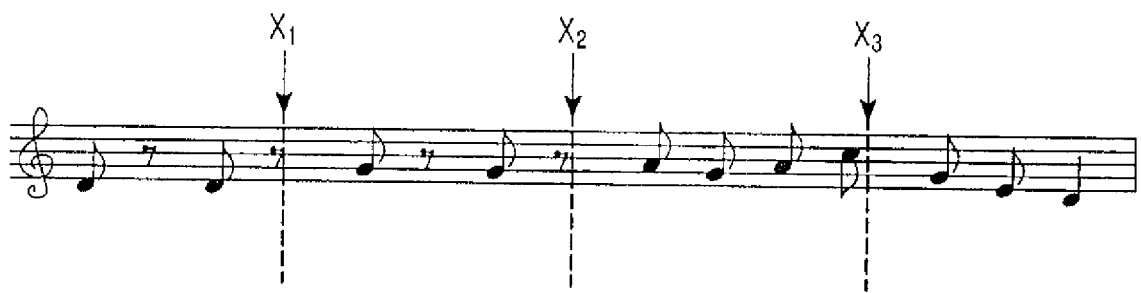
FIG. 6 is an exemplary diagram illustrating a music score image in which the staff lines region is divided temporarily in accordance with the method shown in FIG. 2.

In step 320, the staff lines region is divided in consideration of the number of division regions and the number of boundary lines determined as above. For example, assuming that the longitudinal direction of the staff lines region is the horizontal direction, the width W of the horizontal direction of the staff lines region is divided into four regions having the same width, as shown in FIG. 6. (i.e., N=4*1). Here, the boundary lines in dividing the image may be referred to as X1, X2, and X3.

In step 330, intersections of the staff lines and the boundary lines are determined and image coordinates thereof are checked. At this time, it is preferable to check the coordinates of intersections of the top line or the bottom line of the typically 5, lines included in the staff lines and the boundary lines. However, it is not intended to limit the present invention to this, and intersections of any selected one of the staff lines and the boundary lines may be checked. However, the selected line intersecting with the boundary lines should be identical in all regions.

When coordinates of the intersections are checked in step 330, y-coordinates of odd-numbered intersections are checked. Further, absolute values of a difference in distance between y-coordinates of odd-numbered intersections is calculated. An average value of the difference in distance between all odd-numbered intersections (for example, total [(K/2)−1]) is then calculated (step 340). For example, if the number (K) of boundary lines is five (5), y-coordinates of five intersections are checked. Further, an absolute value of a difference in distance between y-coordinates of a first and a third intersection is calculated, and an absolute value of a difference in distance between y-coordinates of the third intersection and a fifth intersection is calculated. An average value of the absolute values of the two calculated differences in distance is then calculated.

In addition, the sum of absolute values of the differences in distance can be calculated by equation (3), and the average value of the differences in distance can be calculated by equation (4). Here, a y-coordinate of the K-th intersection is not checked, and can be removed from the calculation of an absolute value for difference in distance.

$$dist_i = |y_{i+2} - y_{i+1}| + |y_{i+1} - y_i| \quad (3)$$

$$dist_{avg} = \frac{\sum_{i=0}^{\frac{k}{2}-1} dist_i}{\frac{k}{2}-1} \quad (4)$$

In step 350, the average value of the differences in distance calculated in step 340 is compared with a predetermined threshold value. In one aspect of the invention, the predetermined threshold value may be selected as being equal to, for example, 1.0 units. As a comparison result, when the average value exceeds the predetermined threshold value, the variable, t, (see equation 1) is increased (step 355), and steps 310 to 340 are re-executed (i.e., iteratively repeated).

However, the average value is smaller than the predetermined threshold value (for example, 1.0), the number of divisions of the staff lines region is confirmed based on the parameter value set in step 310, the staff lines region is divided (step 360) accordingly.

Figure 7A:
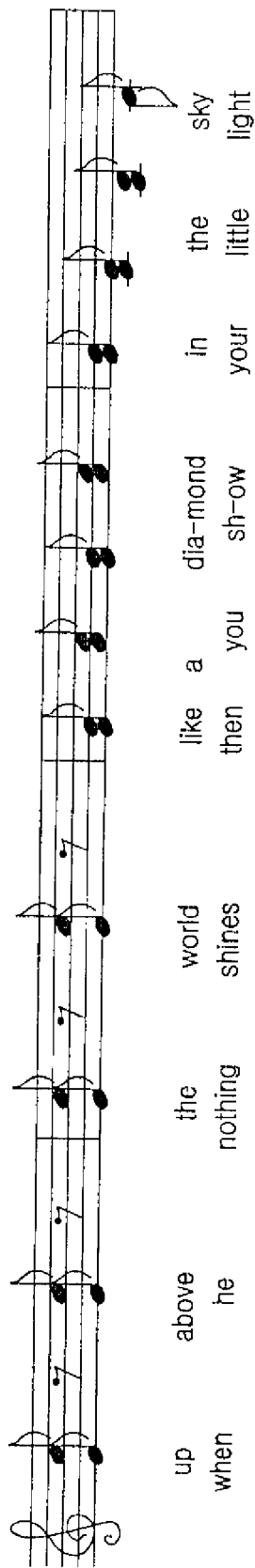
FIG. 7 is an exemplary diagram illustrating a dividing result of the staff lines region in a longitudinal direction in accordance with the method shown in FIG. 2.
Figure 7B:
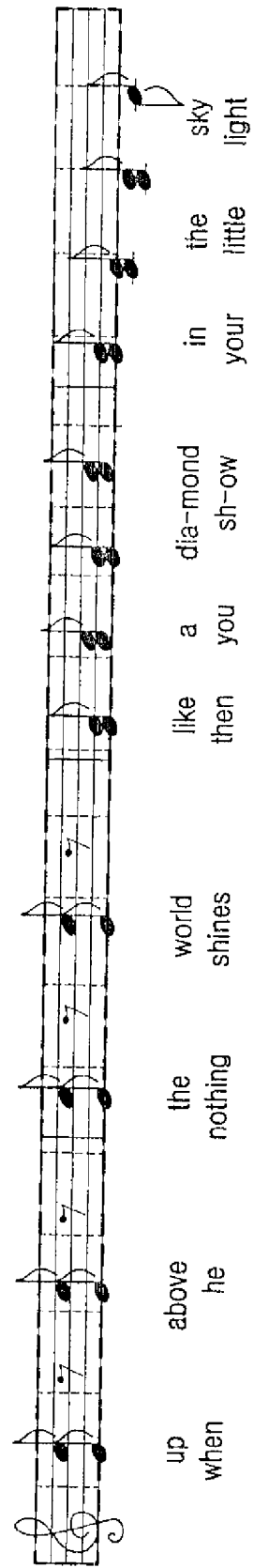
Figure 8A:
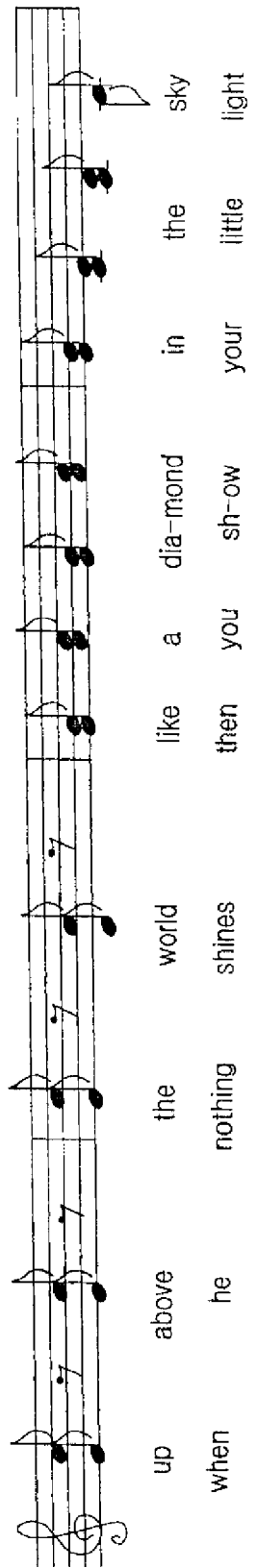
FIG. 8 is an exemplary diagram illustrating a dividing result of the staff lines region in a longitudinal direction, in which the music score included in the image of FIG. 7 is inclined at an angle of about 2°.
Figure 8B:
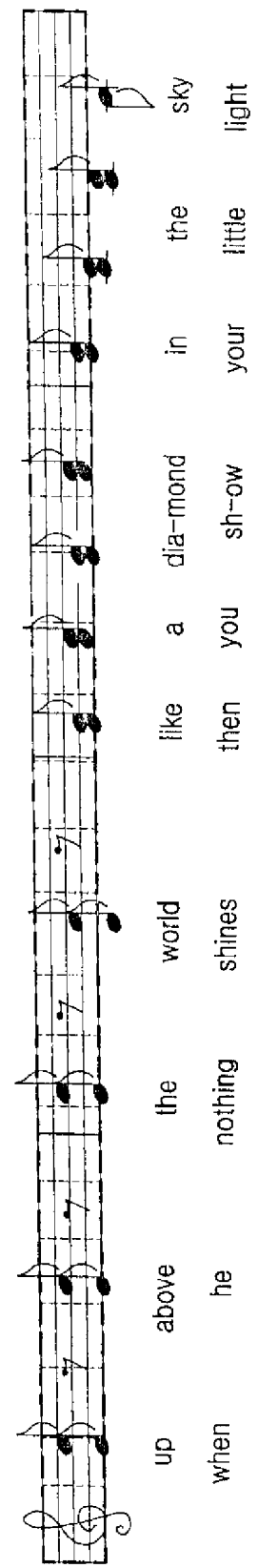

FIGS. 7A, 7B and 8A, 8B are diagrams illustrating an exemplary division of the staff lines region in a longitudinal direction by using the method of removing the staff lines region of a music score image according to an embodiment of the present invention. In the image of FIG. 7, there is almost no gradient, and FIG. 8 illustrates the image where the staff lines region of FIG. 7 is inclined at an angle of about 2°. When the method according to the embodiment of the present invention is applied to the staff lines region included in FIG. 7A in order to divide the staff lines region in a longitudinal direction, as a result, it can be seen that the staff lines region is divided into 19 regions as shown in FIG. 7B. Similarly, the method according to the embodiment of the present invention is applied to the staff lines region shown in FIG. 8A in order to divide the staff lines region in a longitudinal direction, and as a result, it can be seen that the staff lines region is divided into 23 regions as shown in FIG. 8B. Therefore, according to an embodiment of the present invention, the larger a gradient of the music score image is, the more the number of divided musical images can be increased. Therefore, even though the staff lines region included in the image is inclined, it is possible to accurately extract the staff lines.

Returning to FIG. 2, at step 400 each staff line is estimated in each divided region. Preferably, in step 400, after calculating a histogram in a longitudinal direction (for example, a horizontal direction) of each divided region, a region where a value (or characteristic) of the histogram exceeds a predetermined value may be estimated as each staff line. That is, in step 400, a histogram ($V_{hist}(y)$) in a longitudinal direction of each divided region may be compared to a predetermined threshold value T as shown in equation (5) below. Here, the threshold value T can be obtained from equation (6) as:

$$V_{hist}(y) > T, \quad (5)$$

$$T = \frac{hist_{max} + hist_{avg}}{2} \quad (6)$$

where $hist_{max}$ is a maximum value of the histograms in each region in a longitudinal direction, and $hist_{avg}$ is an average value of the histograms in each region in a longitudinal direction. Note that this operation is performed with respect to the histograms within each of the divided regions.

Figure 9:
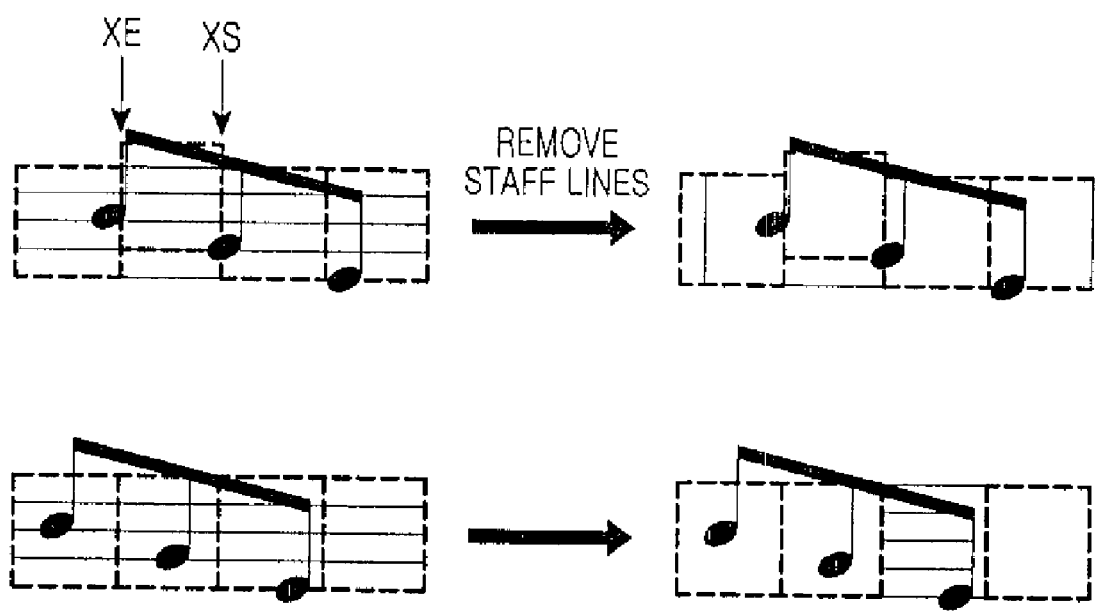
FIG. 9 is an exemplary diagram illustrating an image in which each line included in the staff lines is removed by using the method of removing the staff lines of a music score image according to an embodiment of the present invention.

Moreover, even if each staff line is estimated in step 400, when the line is overlapped with an object such as a beamed node included in the music score, it can be difficult to separate the line from the object (refer to FIG. 9). Therefore, the embodiment of the present invention includes the step of extracting each line estimated in step 400 by separating the line from other objects included in the image (step 500). In step 500 (FIG. 2), when a corresponding pixel in each line is a black pixel, the ($L(Line_j)$) including the black pixel is calculated within each line the black pixel.

When the calculated value, $L(Line_j)$, satisfies the Equation 7, i.e., $L(Line_j)$ is larger than 80% of the width of the division region, the estimated each line is considered as a candidate region of the staff lines, so that the above problem is solved.

Furthermore, when the upper adjacent pixel and the lower adjacent pixel of the corresponding pixel in each line are black pixels, the division region length ($L(Line_j)$) including the upper adjacent pixel and the lower adjacent pixel of the corresponding pixel in each line can also be calculated This calculated value, $L(Line_j)$ can also be calculated by the method to determine the candidate region.

$$L(Line_j) > (XE - XS + 1) \times 0.8 \quad (7)$$

Here, XS and XE represent a start point and an end point of the division region, respectively.

Figure 10:
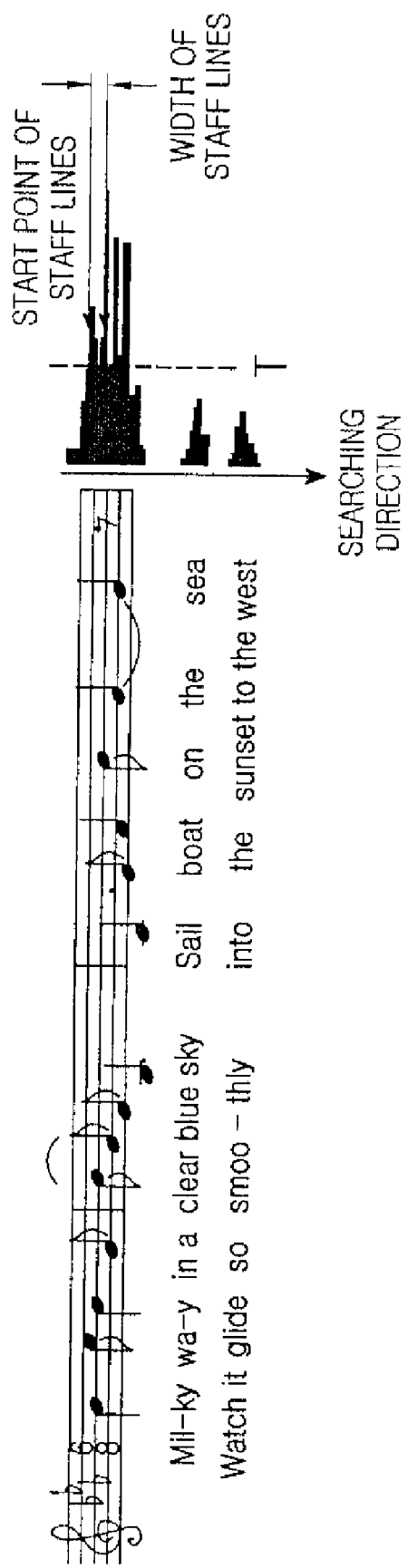
FIG. 10 is an exemplary diagram illustrating an image including a music score, a calculating result of a histogram in a horizontal direction, and a threshold value (T) according to an embodiment of the present invention.

Further, in step 500, the histogram of each line of the estimated staff lines is searched in a horizontal direction as shown in FIG. 10. When a point has a value higher than the threshold value T for the first time, the point is determined as the start point of the staff line, and when points continuously have more than the threshold value T, the length of the continuous points is determined as the thickness of the staff lines. Accordingly, the start point and the width of the staff lines are calculated.

Figure 11:
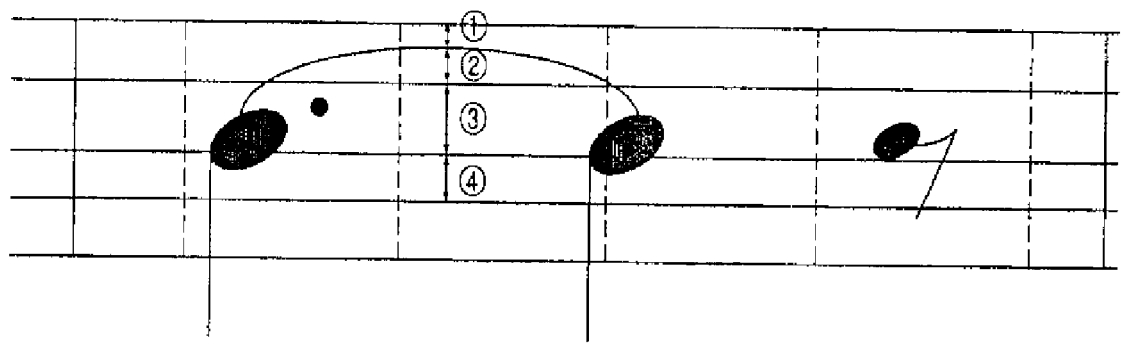
FIG. 11 is an exemplary diagram illustrating a part of an image including a music score according to an embodiment of the present invention.

Further, in step 500, in order to more accurately extract the staff lines from the lines estimated as the staff lines, it is necessary to check that other objects, such as a tie, are not included. FIG. 11 shows an diagram illustrating a music score image including the staff lines. Referring to FIG. 11, it can be seen that there is a tie between musical notes in the music score image. Since the staff lines are divided into n equal parts according to the present invention, there may occur difficulty in classifying the tie and the staff lines when the histogram, only in a horizontal direction, is used. This difficulty is eliminated by comparing distances between the staff lines as follows. As shown in FIG. 11, when there is almost no difference between the sum of distances between two adjacent staff lines and distance of a next staff line, it is judged that there is a tie between □ and □, so that the object is removed as a candidate of the staff lines. Further, when the difference between distances between staff lines is more than 5 pixels, it is judged that the object is not part of the staff line, so that the object is removed as a candidate of the staff lines.

As described above, each line included in the staff lines is completely extracted through step 500.

In step 600, the staff lines extracted in step 500 are removed from the image. Further, when the number of black pixels connected together is more than 1.5 times the width of the staff lines, the black pixels corresponding to the coordinates are removed. Further, after removing the staff lines, a procedure of removing noise is additionally performed. In the procedure of removing noise, elements made of connected black pixels are combined into one object by using the connected component analysis. Then, when the width of the extracted object is less than one-quarter (¼) the distance of the staff lines, the extracted object is determined to be noise and is removed.

Figure 12:
FIG. 12 is an exemplary diagram illustrating a result of removing the staff lines of a music score image without a gradient in accordance with the method shown in FIG. 2.
Figure 13:
FIG. 13 is an exemplary diagram illustrating a result of removing the staff lines when the music score image of FIG. 12 is inclined at an angle of about 1°.
Figure 14:
FIG. 14 is an exemplary diagram illustrating a result of removing the staff lines when the music score image of FIG. 12 is inclined at an angle of about 2°.
Figure 15:
FIG. 15 is an exemplary diagram illustrating a result of removing the staff lines when the music score image of FIG. 12 is bent about the image.
Figure 16:
FIG. 16 is an exemplary diagram illustrating a result of removing the staff lines when the music score image is relatively more bent than that of FIG. 15.

FIGS. 12 to 16 show diagrams of a music score image wherein the staff lines are removed by applying the method of the present invention. FIG. 12 shows a diagram of a result of removing the staff lines of a music score image without a gradient by applying the method of the present invention. FIG. 13 shows diagram illustrating a result of removing the staff lines when the music score image of FIG. 12 is inclined at an angle of about 1°. FIG. 14 shows diagram of a result of removing the staff lines when the music score image of FIG. 12 is inclined at an angle of about 2°. FIG. 15 shows a diagram illustrating a result of removing the staff lines when the music score image of FIG. 12 is bent about the image. FIG. 16 shows a diagram illustrating a result of removing the staff lines when the music score image is bent event further than that shown in FIG. 15. Referring to FIGS. 12 to 16, according to the method of removing the staff lines of a music score image of the present invention, it can be seen that even though the staff lines included in a music score image are inclined or bent, the staff lines can be extracted to be removed accurately.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware (referred to generally as processor) include memory components, e.g., RAM, ROM, Flash, etc. that may store or receive software or computer code that when accessed and executed by the computer, processor or hardware implement the processing methods described herein.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method of removing the staff lines from a music score included in a received image, the method comprising the steps of:
   detecting a region containing the staff lines within the music score image;
   checking a gradient of the staff lines,
   dividing the staff lines extending continuously in a longitudinal direction into a plurality of regions in consideration of the gradient;
   estimating each of the staff lines included in each of the divided regions of the music score by analyzing a histogram of the image within the region;
   determining each of the estimated staff lines from the music score; and
   removing each of the determined staff lines from the music score.

2. The method as claimed in claim 1, wherein, in the step of detecting at least one region containing the staff lines, the histogram of the image is calculated and the region is detected by checking a distribution of the histogram.

3. The method as claimed in claim 1, wherein the gradient of the staff lines is measured on the basis of coordinates of the image.

4. The method as claimed in claim 1, further comprising the step of binary-coding the image received from the outside.

5. The method as claimed in claim 1, further comprising the step of removing noise in consideration of a dimension of an object by analyzing the object included in the image.

6. The method as claimed in claim 5, wherein consecutively arranged elements having the same pixel value are considered as a single object, and the single object is then processed as noise when the size of the single object is smaller than a predetermined value.

7. The method as claimed in claim 1, wherein the step of estimating each of the staff lines comprises the steps of:
   calculating a histogram of the divided regions in the image; and
   comparing the calculated histogram value and a predetermined threshold value,
   wherein, when the calculated histogram value is larger than the predetermined threshold value, the regions are estimated to correspond to one of the staff lines.

8. The method as claimed in claim 7, wherein the threshold value is set in consideration of a maximum value and an average value of the calculated histogram in a longitudinal direction.

9. The method as claimed in claim 1, wherein the step of estimating each of the staff lines comprises the steps of:
estimating a top or a bottom one of the staff lines by using the histogram in a longitudinal direction; and
estimating each one in the staff lines on the basis of a value of the histogram of the top or the bottom line.

10. The method as claimed in claim 9, wherein each line included in the staff lines is estimated in consideration of a width between each line included in the staff lines.

11. The method as claimed in claim 1, wherein, in the estimated lines included in the staff lines, when a difference in distance between adjacent lines is larger than the predetermined threshold value, it is determined that the estimated lines are not included in the staff lines.

12. The method as claimed in claim 1, wherein the step of dividing the staff lines region comprises the steps of:
setting a number of boundary lines for dividing the staff lines;
dividing the staff lines in a longitudinal direction equally in accordance with the number of the boundary lines;
checking gradients of the staff lines on the basis of coordinates corresponding to intersections of the staff lines and the boundary line dividing the staff lines in the image; and
confirming a number of divisions of the staff lines in consideration of the gradients.

13. The method as claimed in claim 1, wherein the step of dividing the staff lines region comprises the steps of:
setting an initial value of a number of points for dividing the staff lines;
dividing the staff lines in a longitudinal direction equally in accordance with the number of the points;
calculating a difference in distance between the points on the basis of coordinates corresponding to intersections of the staff lines and the boundary line dividing the staff lines in accordance with the initial value;
calculating an average value of the calculated differences in distance, and comparing the average value with a predetermined threshold value; and
checking the number of the points used in dividing the staff lines into regions, and comparing with a predetermined threshold value, wherein
when the average value is larger than the predetermined threshold value or when the number of the points used used in dividing the staff lines into regions is smaller than the predetermined threshold value, the number of the points for dividing the staff lines is reset, and the steps of dividing the staff lines, calculating differences in distance between the intersections, and calculating an average value are re-executed, and
when the average value is equal to or smaller than the predetermined threshold value or when the number of the points used in dividing the staff lines into regions is equal to or larger than the predetermined threshold value, the staff lines are divided in a longitudinal direction equally in accordance with the number of points used.

14. An apparatus for removing the staff lines from a music score included in a received image, comprising:
a processor in communication with a memory, the memory containing code which when accessed by the processor enables the processor to execute the steps of:
detecting a region containing the staff lines within the music score image;
checking a gradient of the staff lines,
dividing the staff lines extending continuously in a longitudinal direction into a plurality of regions in consideration of the gradient;
estimating each of the staff fines included in each of the divided regions of the music score by analyzing a histogram of the image;
determining each of the estimated staff lines from the music score; and
removing each of the determined staff lines from the music score.

15. The apparatus as claimed in claim 14, wherein the step of dividing the staff lines region comprises the steps of:
setting a number of boundary lines for dividing the staff lines;
dividing the staff lines in a longitudinal direction equally in accordance with the number of the boundary lines;
checking gradients of the staff lines on the basis of coordinates corresponding to intersections of the staff lines and the boundary line dividing the staff lines in the image; and
confirming a number of divisions of the staff lines in consideration of the gradients.

16. The apparatus as claimed in claim 14, wherein the step of dividing the staff lines region comprises the steps of:
setting an initial value of a number of points for dividing the staff lines;
dividing the staff lines in a longitudinal direction equally in accordance with the number of the points;
calculating a difference in distance between the points on the basis of coordinates corresponding to intersections of the staff lines and the boundary line dividing the staff lines in accordance with the initial value;
calculating an average value of the calculated differences in distance, and comparing the average value with a predetermined threshold value; and
checking the number of the points used in dividing the staff lines into regions, and comparing with a predetermined threshold value, wherein
when the average value is larger than the predetermined threshold value or when the number of the points used in dividing the staff lines into regions is smaller than the predetermined threshold value, the number of the points for dividing the staff lines is reset, and the steps of dividing the staff lines, calculating differences in distance between the intersections, and calculating an average value are re-executed, and
when the average value is equal to or smaller than the predetermined threshold value or when the number of the points used in dividing the staff lines into regions is equal to or larger than the predetermined threshold value, the staff lines are divided in a longitudinal direction equally in accordance with the number of points used.

17. The apparatus as claimed in claim 14, wherein the step of estimating each of the staff lines comprises the steps of:
estimating a top or a bottom one of the staff lines by using the histogram in a longitudinal direction; and
estimating each one in the staff lines on the basis of a value of the histogram of the top or the bottom line.

18. An apparatus for removing the staff lines from a music score included in a received image, comprising:
processing means for:
receiving an image of a music score containing at least one staff line;

determining a number of boundary lines used to divide said image;

dividing the image into a plurality of regions based on the number of boundary lines;

performing a histogram analysis of each of said regions, estimating each of the staff lines based on a histogram of the regions, wherein a staff line is determined when a corresponding histogram exceeds a predetermined limit; and removing each of the estimated staff lines from the music score.

19. The apparatus of claim 18, wherein said histogram analysis is preformed based on a number of pixels in a horizontal direction.

20. The apparatus of claim 18, wherein said processing means further comprising:

determining a distance between each of said estimated lines.

21. The apparatus of claim 18, wherein said number of boundary lines is determined as a function of a gradient of said estimated staff lines.

22. The apparatus of claim 21, wherein said number of boundary lines is iteratively changed based on at least one characteristic of a corresponding histogram within said plurality of regions.

* * * * *